United States Patent
Mitsuya et al.

(10) Patent No.: US 8,682,355 B2
(45) Date of Patent: Mar. 25, 2014

(54) POSITION ESTIMATION APPARATUS, POSITION ESTIMATION METHOD, PROGRAM, AND POSITION ESTIMATION SYSTEM

(75) Inventors: Koshiro Mitsuya, Tokyo (JP); Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 13/331,555

(22) Filed: Dec. 20, 2011

(65) Prior Publication Data

US 2012/0184295 A1 Jul. 19, 2012

(30) Foreign Application Priority Data

Jan. 17, 2011 (JP) .................. 2011-006751

(51) Int. Cl.
*H04W 24/00* (2009.01)
(52) U.S. Cl.
USPC ............. 455/456.6; 455/456.3; 455/456.1; 455/435.1; 455/513; 455/550.1
(58) Field of Classification Search
USPC .......... 455/456.6, 456.3, 456.1, 414.2, 435.1, 455/435.2, 513, 556.2, 550.1
See application file for complete search history.

(56) References Cited

U.S. PATENT DOCUMENTS

| 7,272,394 B2* | 9/2007 | Krishnakumar et al. .. 455/435.2 |
| 8,339,242 B2* | 12/2012 | Rekimoto ....................... 340/8.1 |
| 2008/0164997 A1* | 7/2008 | Aritsuka et al. ......... 340/539.13 |
| 2008/0254808 A1* | 10/2008 | Rekimoto ................... 455/456.1 |
| 2010/0278079 A1* | 11/2010 | Meyer et al. ................... 370/255 |
| 2012/0142369 A1* | 6/2012 | Hodges ....................... 455/456.1 |

FOREIGN PATENT DOCUMENTS

JP 2005-229617 8/2005

OTHER PUBLICATIONS

U.S. Appl. No. 13/817,625, filed Feb. 19, 2013, Mitsuya, et al.
U.S. Appl. No. 13/811,805, filed Jan. 23, 2013, Mitsuya, et al.

* cited by examiner

*Primary Examiner* — Khai M Nguyen
(74) *Attorney, Agent, or Firm* — Oblon, Spivak, McClelland, Maier & Neustadt, L.L.P.

(57) ABSTRACT

Provided is a position estimation apparatus including a storage unit in which at least one piece of section information indicating a section in a structure and at least one piece of registered measurement information are stored in association with each other, and an estimation unit for determining, among the at least one piece of registered measurement information, registered measurement information whose degree of similarity to measurement information acquired by wireless measurement for a wireless signal transmitted from a base station exceeds a threshold value, and estimating section information that is associated with the registered measurement information as an acquisition position of the measurement information. The estimation unit performs, using different threshold values, determination of the degree of similarity for registered measurement information that is associated with latest section information which is a latest estimation result and determination of the degree of similarity for another piece of registered measurement information.

7 Claims, 9 Drawing Sheets

| BASE STATION ID | SIGNAL STRENGTH |
|---|---|
| 30A | -57dBm |
| 30B | -80dBm |

FIG.8

| POSITION | P1 | P2 | P3 | P4 | P5 | P6 | P7 | P8 | P9 |
|---|---|---|---|---|---|---|---|---|---|
| ESTIMATION RESULT | — | AREA A | AREA A | AREA A | AREA A | AREA B | AREA B | AREA B | — |

POSITION ESTIMATION APPARATUS, POSITION ESTIMATION METHOD, PROGRAM, AND POSITION ESTIMATION SYSTEM

BACKGROUND

The present disclosure relates to a position estimation apparatus, a position estimation method, a program, and a position estimation system.

Recently, receiver apparatuses capable of receiving wireless signals transmitted from satellites have been installed in moving bodies such as vehicles, mobile telephones, and the like. By using GPS (Global Positioning System) positioning, it is possible to estimate the position of the moving body in which the receiver apparatus is installed. Such position estimating technology that uses a receiver apparatus is an important base technology in a wide range of fields such as navigation, security and entertainment.

Further, a position estimation method is also conceivable according to which a wireless terminal that performs wireless communication with a base station (an access point) on a wireless LAN (Local Area Network) measures the signal strength of a signal transmitted from a wireless base station and a position estimation apparatus that is capable of communicating with the wireless terminal estimates the position of the wireless terminal based on this signal strength. For example, the base station of the wireless LAN transmits beacons for notifying a surrounding area of the existence of the base station of the wireless LAN at predetermined intervals (for example, 5 times/sec). The wireless terminal transmits the signal strength of such a beacon to the position estimation apparatus, and the position estimation apparatus can estimate the position of the wireless terminal based on the signal strength and the position of the base station of the wireless LAN that is registered in advance. With the above-described position estimation method, since the base stations of the wireless LAN are installed in indoor and underground environments, it is possible to perform position estimation in indoor or underground environments, which is difficult using the position estimation technology based on the GPS positioning.

In this type of position estimation method, when a user carrying a wireless terminal is present in a building or structure, not only the latitude and longitude of the wireless terminal, but also information indicating which area (for example, which floor) in the building or structure the user is currently in is important. For example, JP 2005-229617A discloses a technology according to which a wireless terminal measures signal strengths of wireless signals transmitted from a plurality of base stations, and a position estimation server estimates that the wireless terminal exists in an area where a base station which is the transmission source of a wireless signal with a strong signal strength is present.

SUMMARY

However, according to this type of position estimation method, there is an issue that a stable estimation result is not obtained at a boundary position of an area. For example, it is conceivable that the estimation result becomes unstable in such a way that, at a boundary position of a first area and a second area, a current position may be estimated to be in the first area or in the second area.

In light of the foregoing, it is desirable to provide a position estimation apparatus, a position estimation method, a program, and a position estimation system which are novel and improved, and which are capable of obtaining stable position estimation result.

According to an embodiment of the present disclosure, there is provided a position estimation apparatus which includes a storage unit in which at least one piece of section information indicating a section in a structure and at least one piece of registered measurement information are stored in association with each other, and an estimation unit for determining, among the at least one piece of registered measurement information, registered measurement information whose degree of similarity to measurement information acquired by wireless measurement for a wireless signal transmitted from a base station exceeds a threshold value, and estimating section information that is associated with the registered measurement information as an acquisition position of the measurement information. The estimation unit performs, using different threshold values, determination of the degree of similarity for registered measurement information that is associated with latest section information which is a latest estimation result and determination of the degree of similarity for another piece of registered measurement information.

The estimation unit may use a first threshold value when performing determination of the degree of similarity for the other piece of registered measurement information, which is not associated with the latest section information, and use a second threshold value which is lower than the first threshold value when performing determination for the degree of similarity for the registered measurement information that is associated with latest section information.

The position estimation apparatus may further include a wireless communication unit for receiving a wireless signal that is transmitted from the base station, and a measurement unit for performing signal strength measurement for the wireless signal received by the wireless communication unit.

The position estimation apparatus may further include a communication unit for receiving the measurement information from a wireless terminal which performs signal strength measurement for a wireless signal that is transmitted from the base station, and transmits the section information estimated by the estimation unit to the wireless terminal.

According to another embodiment of the present disclosure, there is provided a position estimation method which includes estimating, by determining, among at least one piece of registered measurement information stored in association with at least one piece of section information indicating a section in a structure, registered measurement information whose degree of similarity to measurement information acquired by wireless measurement for a wireless signal transmitted from a base station exceeds a threshold value, section information that is associated with the registered measurement information as an acquisition position of the measurement information. In the step of estimating, determination of the degree of similarity for registered measurement information that is associated with latest section information which is a latest estimation result and determination of the degree of similarity for another piece of registered measurement information are performed using different threshold values.

According to another embodiment of the present disclosure, there is provided a program for causing a computer to function as a position estimation apparatus including a storage unit in which at least one piece of section information indicating a section in a structure and at least one piece of registered measurement information are stored in association with each other, and an estimation unit for determining, among the at least one piece of registered measurement information, registered measurement information whose degree of similarity to measurement information acquired by wireless measurement for a wireless signal transmitted from a base station exceeds a threshold value, and estimating section information that is associated with the registered measurement information as an acquisition position of the measurement information. The estimation unit performs, using different threshold values, determination of the degree of similarity for registered measurement information that is associated with latest section information which is a latest estimation result and determination of the degree of similarity for another piece of registered measurement information.

According to another embodiment of the present disclosure, there is provided a position estimation system which includes a wireless terminal including a wireless communication unit for receiving a wireless signal that is transmitted from a base station, and a measurement unit for performing signal strength measurement for the wireless signal received by the wireless communication unit, and a position estimation apparatus including a storage unit in which at least one piece of section information indicating a section in a structure and at least one piece of registered measurement information are stored in association with each other, and an estimation unit for determining, among the at least one piece of registered measurement information, registered measurement information whose degree of similarity to measurement information that is based on the signal strength measurement by the wireless terminal exceeds a threshold value, and estimating section information that is associated with the registered measurement information to be an acquisition position of the measurement information. The estimation unit performs, using different threshold values, determination of the degree of similarity for registered measurement information that is associated with latest section information which is a latest estimation result and determination of the degree of similarity for another piece of registered measurement information.

According to the embodiments of the present disclosure described above, a stable position estimation result can be obtained.

BRIEF DESCRIPTION OF THE DRAWINGS

FIG. 8 is an explanatory diagram showing a concrete example of an estimation result for each position in relation to a case where a user carrying a wireless terminal moves along a route;

DETAILED DESCRIPTION OF THE EMBODIMENT(S)

Figure 1:
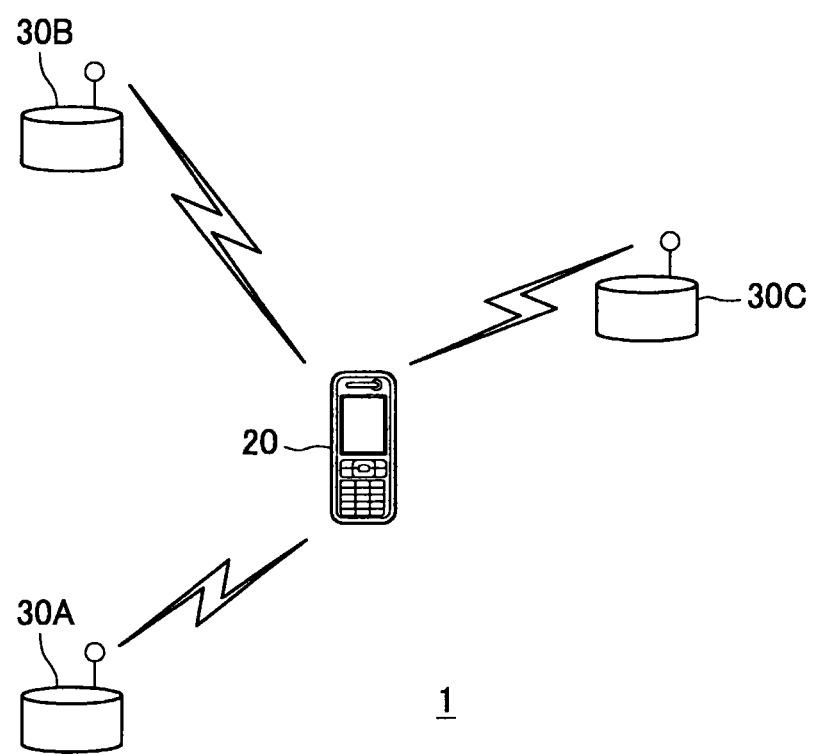
FIG. 1 is an explanatory diagram showing an example configuration of a position estimation system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as base stations 30A and 30B. However, if it is not particularly necessary to distinguish each of a plurality of structural elements having substantially the same functional configuration, only the same reference numeral is assigned. For example, if it is not particularly necessary to distinguish between the base stations 30A and 30B, they are simply referred to as the base station(s) 30.

Furthermore, "DETAILED DESCRIPTION OF THE EMBODIMENT(S)" will be described in the following order.
1. Basic Configuration of Position Estimation System
2. Detailed Explanation of Wireless Terminal
2-1. Hardware Configuration of Wireless Terminal
2-2. Function of Wireless Terminal
2-3. Operation of Wireless Terminal
3. Modified Example
4. Conclusion <1. Basic Configuration of Position Estimation System>

First, a position estimation system 1 according to an embodiment of the present disclosure will be schematically described with reference to FIG. 1.

FIG. 1 is an explanatory diagram showing an example configuration of the position estimation system 1 according to an embodiment of the present disclosure. As shown in FIG. 1, the position estimation system 1 according to the present embodiment includes a wireless terminal 20 having the function of a position estimation apparatus and base stations 30A to 30C.

The base station 30 relays communication between communication devices that are spatially dispersed. For example, the base station 30 can relay wireless communication between a wireless terminal 20 and another wireless terminal (not shown) that are within a radio wave reachable range, and can also relay communication between the wireless terminal 20 and a communication device that is connected by wire to the base station 30. Specifically, the base station 30 may be a base station of a wireless LAN (Local Area Network) based on the WiFi (Wireless Fidelity) standard, a base station of GSM (Global System for Mobile Communications), or a base station of Bluetooth.

The base station 30 can periodically transmit a beacon signal for notifying surroundings of the existence of the base station 30, in addition to a signal that is transmitted when relaying wireless communication. The beacon signal includes a base station ID serving as base station identification information that is uniquely assigned to the base station 30, for example. As a result, based on the base station ID of the received beacon signal, the wireless terminal 20 can confirm the existence of the base station 30 that exists in the surrounding area.

The wireless terminal 20 can transmit and receive various types of data based on wireless communication controlled by the base station 30. For example, the wireless terminal 20 can receive content data from a content distribution server (not shown) via the base station 30, or can receive and transmit electronic mails to and from another wireless terminal (not shown). Additionally, the content data may be music data such as music, a lecture, a radio program, or the like, visual data such as a motion picture, a television program, a video program, a photograph, a painting, a diagram, or the like, or any other data such as a game, software, or the like.

Additionally, a mobile phone is shown in FIG. 1 as an example of the wireless terminal 20, but the wireless terminal 20 is not limited to such an example. For example, the wireless terminal 20 may be an information processing apparatus such as a PC (Personal Computer), a home video processing device (a DVD recorder, a video deck, or the like), a PHS (Personal Handyphone System), a portable music playback device, a portable video processing device, a PDA (Personal Digital Assistant), a home game console, a portable game console, a household electrical appliance, a navigation device, an information guide terminal, or the like.

Furthermore, when a wireless signal transmitted from the base station 30 is received, the wireless terminal 20 measures the signal strength of the wireless signal. The position of the wireless terminal 20 can be estimated based on measurement information obtained by measuring the signal strength.

Specifically, the wireless terminal 20 has stored therein base station information including position information and the base station ID of each of the base stations 30, and has a function of estimating the latitude and the longitude or the like of the wireless terminal 20 according to, for example, the principle of triangulation, based on the measurement information of a signal strength and the above-mentioned base station information.

Furthermore, if the wireless terminal 20 exists in a building or structure, the wireless terminal 20 is also capable of estimating section information indicating the section, in the building or structure, in which the wireless terminal 20 exists, based on the measurement information of a signal strength and registered information that is registered in advance.

Additionally, the section information may be information indicating a floor in a structure such as a building, or information indicating an area on a same floor. Furthermore, the structure may be a subway station yard, an attraction facility (in this case, a haunted house, a cafeteria, a VVV area and the like are assumed as the section information), a museum facility, a Shinkansen train (in this case, a carriage number is assumed as the section information), or a given man-made object such as a ship.

The wireless terminal 20 according to the embodiment of the present disclosure can estimate the section information as described, and thus it can provide a user with a guide that is according to the section in the structure. For example, in a museum, the wireless terminal 20 can provide a user with a guide that is according to the display area the user is at by image and audio. Also, in a commercial facility accommodating a large number of shops, the wireless terminal 20 can provide a user with information, a coupon, or the like of the shop the user is at.

Furthermore, the wireless terminal 20 according to the embodiment of the present disclosure can obtain a stable estimation result even at a boundary position of a plurality of sections. In the following, the wireless terminal 20 according to the embodiment of the present disclosure will be described in detail.

<2. Detailed Explanation of Wireless Terminal>

(2-1. Hardware Configuration of Wireless Terminal)

Figure 2:
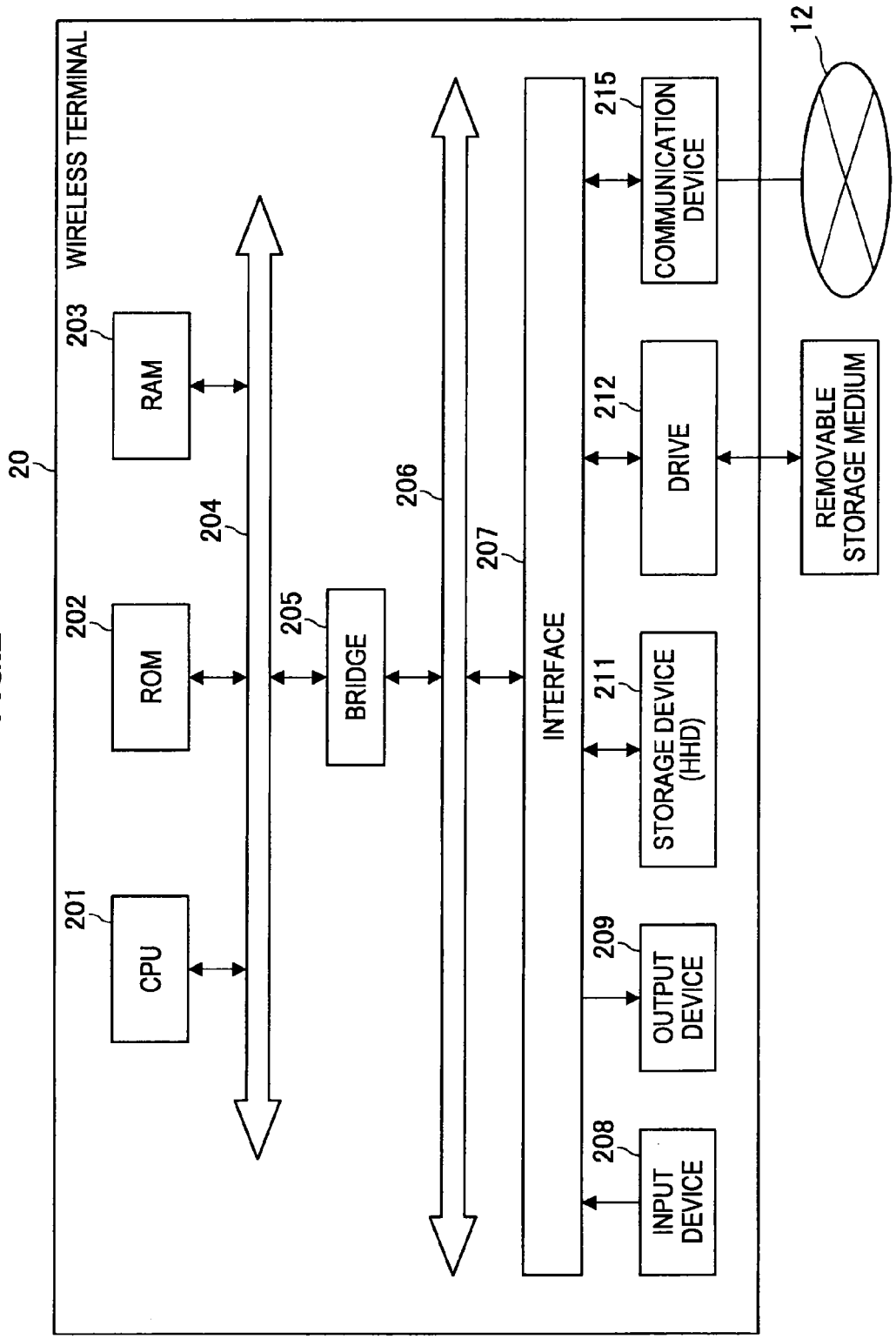
FIG. 2 is a block diagram showing a hardware configuration of a wireless terminal.

FIG. 2 is an explanatory diagram showing a hardware configuration of the wireless terminal 20. The wireless terminal 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, and a communication device 215.

The CPU 201 functions as a processing device and a control device, and it controls the overall operation in the wireless terminal 20 according to programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input device 208 may include input means for a user to input information, such as a mouse, a keyboard, a touch panel, a button, a microphone, a switch or a lever, and an input control circuit for generating an input signal based on a user input and outputting it to the CPU 201, for example. A manager of the wireless terminal 20 manipulates the input device 208 to thereby input various kinds of data or instruct processing operations to the wireless terminal 20.

The output device 210 may include a display device such as a CRT (Cathode Ray Tube) display device, an LCD (Liquid Crystal Display) device, an OLED (Organic Light Emitting Display) device or a lamp, and an audio output device such as a speaker or a headphone, for example. The output device 210 outputs reproduced contents, for example. Specifically, the display device displays various kinds of information such as reproduced video data by texts or images. On the other hand, the audio output device converts reproduced audio data or the like into sound and outputs the sound.

The storage device 211 is a device for data storage that is configured as an example of a storage unit of the wireless terminal 20 according to the present embodiment. The storage device 211 may include a storage medium, a recording device to record data on the storage medium, a reading device to read data from the storage medium, a deleting device to delete data recorded in the storage medium, or the like. The storage device 211 may be an HDD (Hard Disk Drive), for example.

The storage unit 211 drives a hard disk and stores programs to be executed by the CPU 201 and various data. Also, base station information which is described later is recorded on this storage device 211.

The drive 212 is a reader/writer for a storage medium, and it may be incorporated into the wireless terminal 20 or attached thereto externally. The drive 212 reads information recorded on a removable storage medium 24 such as a magnetic disk, an optical disk, a magneto-optical disk or a semiconductor memory which is attached thereto and outputs the information to the RAM 203.

The communication device 215 is a communication interface configured by a communication device or the like to connect to a communication network 12, for example. The communication device 215 may be a communication device compatible with a wireless LAN (Local Area Network), or a wire communication device that performs wired communication.

(2-2. Function of Wireless Terminal)

In the foregoing, a hardware configuration of the wireless terminal 20 according to the embodiment of the present disclosure has been described with reference to FIG. 2. Next, a function of the wireless terminal 20 according to the embodiment of the present disclosure will be described.

Figure 3:
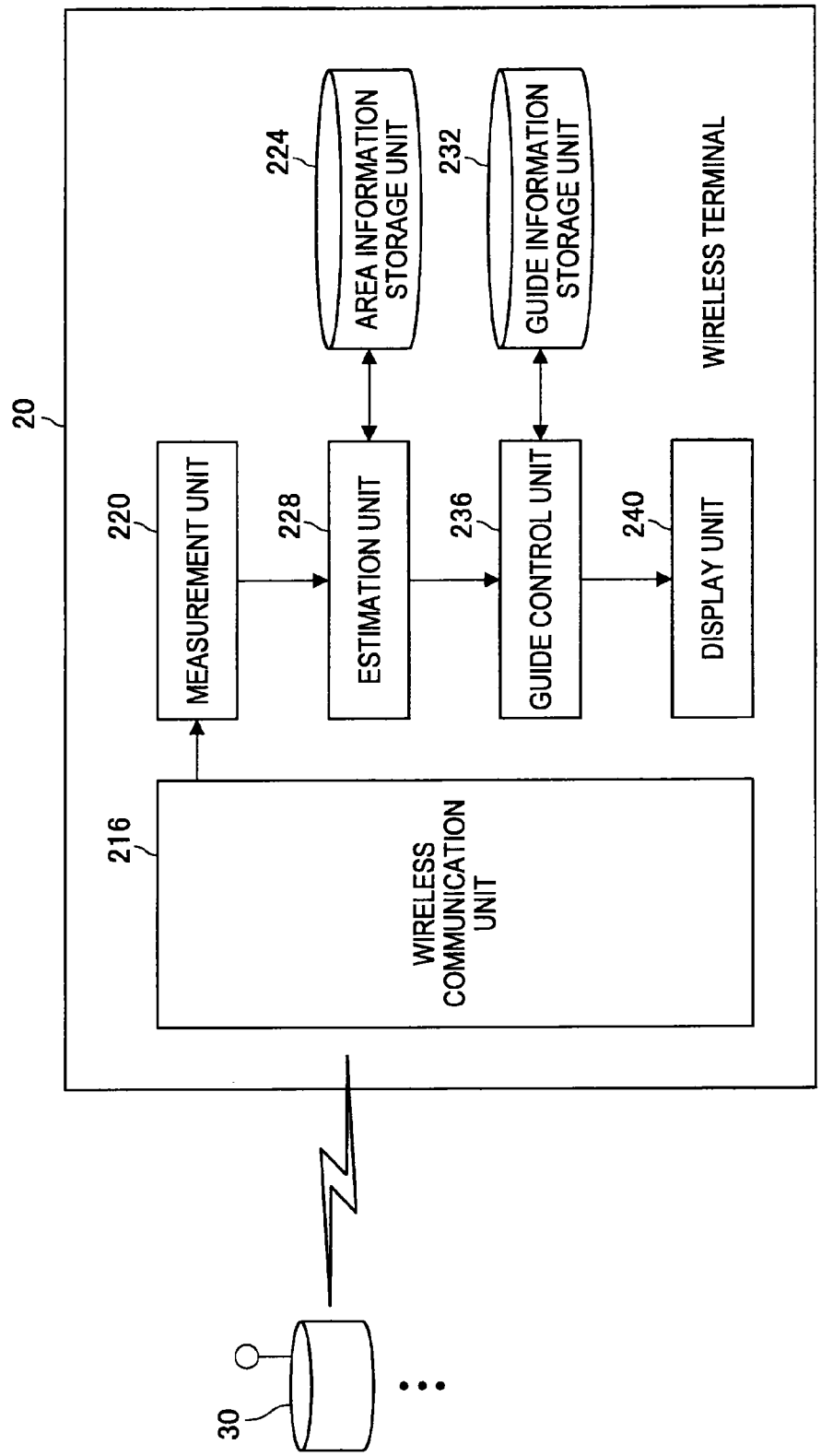
FIG. 3 is a functional block diagram showing a configuration of a wireless terminal according to an embodiment of the present disclosure.

FIG. 3 is a functional block diagram showing a configuration of the wireless terminal 20 according to the embodiment of the present disclosure. As shown in FIG. 3, the wireless terminal 20 according to the embodiment of the present disclosure includes a wireless communication unit 216, a measurement unit 220, an area information storage unit 224, an estimation unit 228, a guide information storage unit 232, a guide control unit 236, and a display unit 240.

The wireless communication unit 216 is an interface to the base station 30, and transmits and receives various signals to and from the base station 30. For example, the wireless communication unit 216 receives from the base station 30 a wireless signal including the base station ID of the base station 30. Additionally, the wireless communication unit 216 may have a wireless communication function defined by IEEE (Institute of Electrical and Electronic Engineers) 802.11a, b, g, n, ac, and the like. Also, the wireless communication unit 216 may have a communication function corresponding to WiMAX (Worldwide Interoperability for Microwave Access) standardized by IEEE 802.16.

The measurement unit 220 measures the signal strength of a wireless signal received by the wireless communication unit 216 from the base station 30. For example, the measurement unit 220 acquires measurement information shown in FIG. 5 by performing signal strength measurement at P2 shown in FIG. 4.

Figure 4:
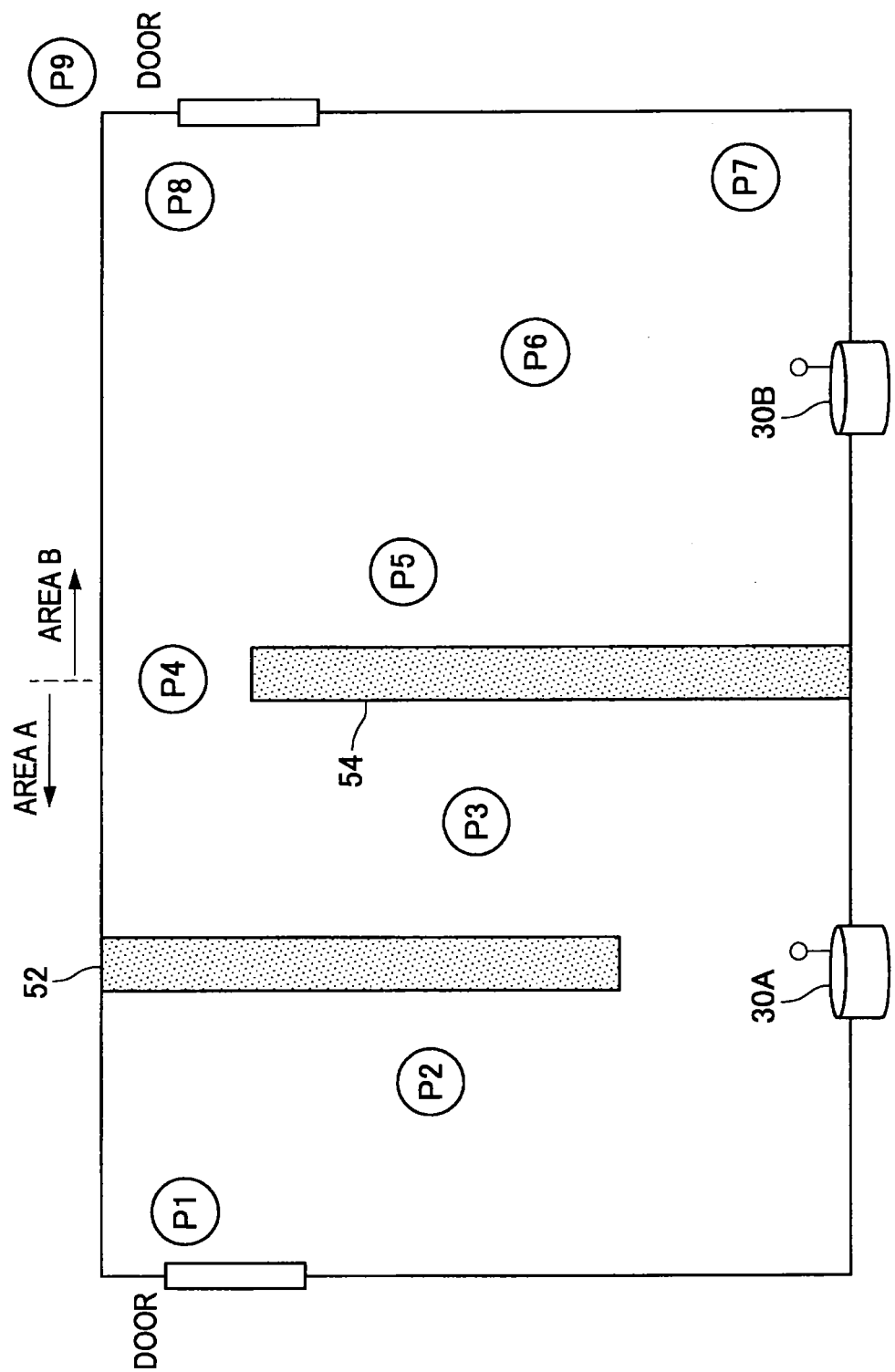
FIG. 4 is an explanatory diagram schematically showing a room in a building or structure.

FIG. 4 is an explanatory diagram schematically showing a room in a building or structure. This room has an entry door and an exit door at positions facing each other. Also, the space is divided by a partition 54 into an area A on the side of the entry door and an area B on the side of the exit door. Further, a base station 30A is arranged in the area A and a base station 30B is arranged in the area B. Additionally, each base station 30 may be installed on the ceiling, for example. The room shown in FIG. 4 is, for example, a room in a museum, and a visitor enters the room from the entry door, follows the route along P1, P2, P3, . . . , P7, P8, exits the exit door, and moves to P9.

Figures 5, 6:
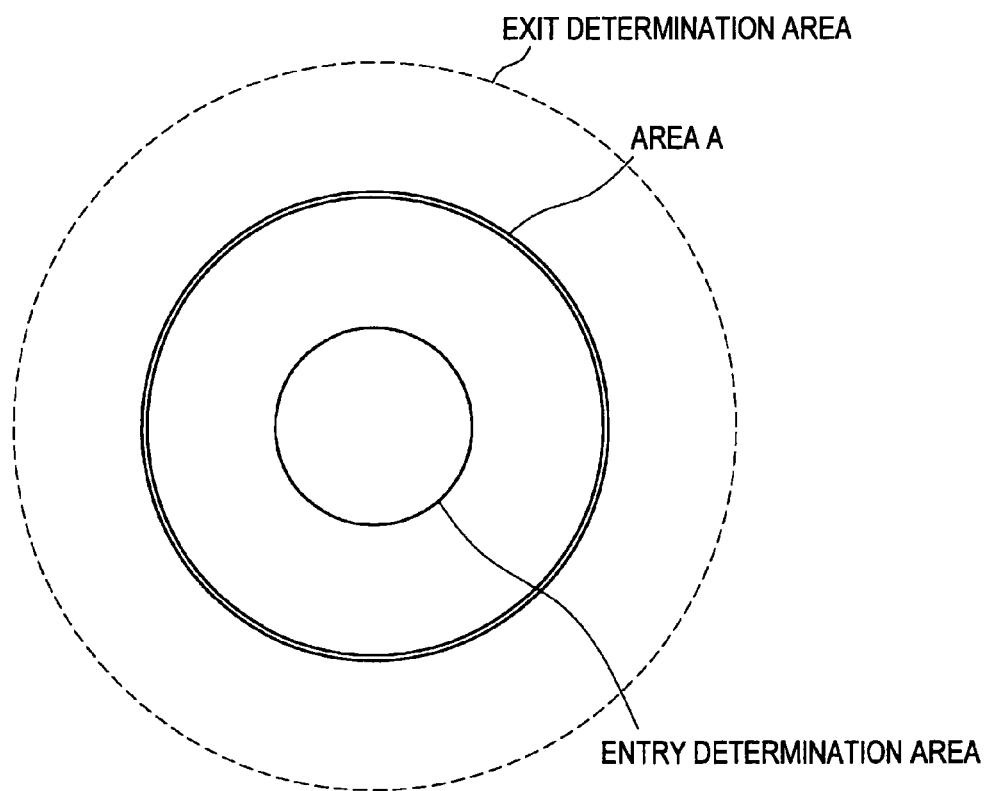
FIG. 5 is an explanatory diagram showing an example of measurement information obtained by signal strength measurement at a position P2.
FIG. 6 is a conceptual diagram showing the relation between an entry determination area and an exit determination area.

FIG. 5 is an explanatory diagram showing an example of the measurement information obtained by signal strength measurement at position P2. Additionally, in this specification, the base station ID is assumed to be equivalent to the reference numeral of the base station 30 for the sake of explanation. For example, in this specification, the base station ID of the base station 30A shown in FIG. 4 is assumed to be 30A.

Since position P2 within the area A is nearer to the base station 30A than to the base station 30B as shown in FIG. 4, the signal strength of the base station 30A is stronger than the signal strength of the base station 30B at position P2 as shown in FIG. 5. Additionally, information including the base station ID and the signal strength is shown in FIG. 5 as the example of the measurement information, but the measurement information is not limited to such an example. For example, the measurement information may be a numerical value based on each combination of the base station ID and the signal strength.

The area information storage unit 224 stores, in association with each other, area information which is an example of the section information and registered measurement information. For example, measurement information which has been obtained by prior signal strength measurement in the area A is associated, as the registered measurement information, with the area information indicating the area A, and measurement information which has been obtained by prior signal strength measurement in the area B is associated, as the registered measurement information, with the area information indicating the area B.

Additionally, the area information storage unit 224 may be a storage medium such as a non-volatile memory, a magnetic disk, an optical disk, a magneto-optical (MO) disk, or the like. As the non-volatile memory, an EEPROM (Electrically Erasable Programmable Read-Only Memory), and an EPROM (Erasable Programmable ROM) may be cited, for example. Also, as the magnetic disk, a hard disk, a discoid magnetic disk, and the like may be cited. Furthermore, as the optical disk, a CD (Compact Disc), a DVD-R (Digital Versatile Disc Recordable), a BD (Blu-Ray Disc (registered trademark)), and the like may be cited.

Furthermore, the functions of the area information storage unit 224 as described, and the estimation unit 228, the guide information storage unit 232, and the guide control unit 236 which will be described later may be downloaded on the wireless terminal 20 possessed by a user at the time of entering a museum or the like, for example, or a wireless terminal 20 implemented with these functions may be lent at the time of entering the museum.

The estimation unit 228 estimates an acquisition position of the measurement information, that is, the area the wireless terminal 20 is currently located, based on the measurement information acquired by the measurement unit 220 and information that is stored in the area information storage unit 224. Specifically, the estimation unit 228 determines the registered measurement information, among the pieces of registered measurement information stored in the area information storage unit 224, whose degree of similarity to the measurement information obtained by the measurement unit 220 exceeds a threshold value, and estimates that the area information that is associated with this registered measurement information is the current position of the wireless terminal 20.

However, if the determination of the degree of similarity is performed using a single threshold value, the estimation result at the boundary of areas will be unstable. Also, in the real environment, the measurement result may be far removed from a theoretical value because of the influence of an obstacle or a wall, and it is conceivable in such a case that a wrong area is estimated.

For example, the signal strength of the base station 30A is stronger and more stable than that of the base station 30B at positions P2 and P3 shown in FIG. 4, and the signal strength of the base station 30B is stronger and more stable than that of the base station 30A at position P6. On the other hand, at position P1, the signal strength of the base station 30B, which is farther away than the base station 30A, may be measured to be stronger, and at positions P7 and P8, the signal strength of the base station 30A, which is farther away than the base station 30B, may be measured to be stronger. Also, at positions P4 and P5, the signal strength relation between the base station 30A and the base station 30B changes depending on the orientation of the wireless terminal 20 or the way it is being held.

Accordingly, the present inventors have come to create the estimation unit 228 of the embodiment of the present disclosure by creatively improving the method of similarity determination. The estimation unit 228 of the embodiment of the present disclosure performs, using different threshold values, determination of the degree of similarity for the registered measurement information that is associated with the area information which is the latest estimation result and the determination of the degree of similarity for another piece of registered measurement information. That is, the estimation unit 228 uses different standards for an entry determination threshold value (a first threshold value) used for determining that the wireless terminal 20 has entered a certain area and an exit determination threshold value (a second threshold value) used for determining that the wireless terminal 20 has exited the area.

To describe in more detail, the estimation unit 228 uses a higher value (standard) for the entry determination threshold value than for the exit determination threshold value. Accordingly, as shown in FIG. 6, the entry determination area where the entry of the wireless terminal 20 is determined and the exit determination area where the exit from the area is determined are different.

FIG. 6 is a conceptual diagram showing the relation between the entry determination area and the exit determination area. The estimation unit 228 uses a higher value for the entry determination threshold value than for the exit determination threshold value, and thus, when the wireless terminal 20 enters the entry determination area which is smaller than the exit determination area and the actual area A, the area A is estimated as the current position. On the other hand, once it is estimated that the wireless terminal 20 has entered the area A, the estimation unit 228 estimates the area A as the current position until the wireless terminal 20 exits the exit determination area.

According to this configuration, it is possible to estimate, in the case the wireless terminal 20 has entered an area for sure, that this area is the current position, and to not estimate, in the case the wireless terminal 20 has exited the area for sure, that the area is the current position. Also, the estimation unit 228 can obtain a stable estimation result near the boundary of areas. For example, the estimation unit 228 is capable of not estimating the area A as the current position in the case entry is not determined near the boundary of the area A, and is capable of stably estimating the area A as the current position in the case entry is determined.

In the following, the relation between the entry determination area and the exit determination area in the room shown in FIG. 4 and a concrete example of an estimation result will be described with reference to FIGS. 7 and 8.

Figure 7:
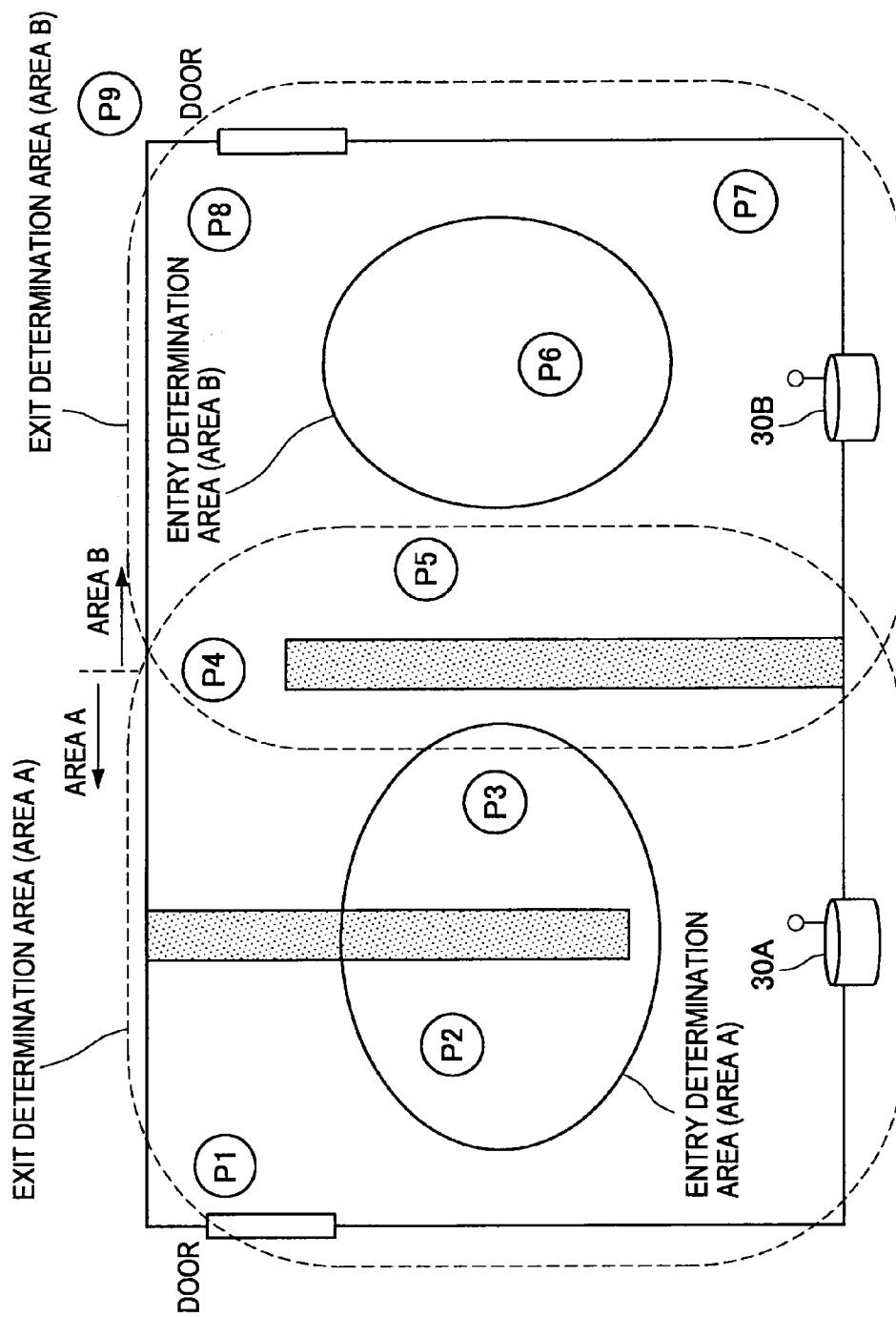
FIG. 7 is an explanatory diagram showing the relation between an actual area, an entry determination area, and an exit determination area.

FIG. 7 is an explanatory diagram showing the relation between an actual area, the entry determination area, and the exit determination area. As shown in FIG. 7, an entry determination area A including position P2 and position P3 is smaller than the actual area A, and an exit determination area A including positions P1 to P5 is larger than the actual area A. Also, an entry determination area B including position P6 is smaller than the actual area B, and the exit determination area B including positions P4 to P8 is larger than the actual area B.

FIG. 8 is an explanatory diagram showing a concrete example of an estimation result for each position in relation to a case where a user carrying the wireless terminal 20 moves along a route. As shown in FIG. 8, first, an estimation result is not obtained even if the user enters the room from the entry door and reaches position P1 because position P1 does not belong to any entry determination area. Then, when the user reaches position P2, since position P2 belongs to the entry determination area A, the estimation unit 228 estimates that the area A is the current position. Then, when the user reaches position 4 and position 5, although position 4 and position 5 do not belong to the entry determination area A, they belong to the exit determination area A, and thus the estimation unit 228 estimates that the area A is the current position.

Then, when the user reaches position P6, since position P6 belongs to the entry determination area B, the estimation unit 228 estimates that the area B is the current position. Then, when the user reaches position P7 and position P8, although position P7 and position P8 do not belong to the entry determination area B, they belong to the exit determination area B, and thus the estimation unit 228 estimates that the area B is the current position. Then, when the user leaves the room through the exit door and reaches position P9, an estimation result is no longer obtained because position P9 does not belong to the exit determination area B.

Return here to the explanation on the configuration of the wireless terminal 20 based on FIG. 3, and the guide information storage unit 232 stores, in association with each other, guide information and the area information. The area information indicates the area where its corresponding guide information is to be provided to the user, and the guide information is information related to an exhibit, a product, or the like in the area, for example. Such a function of the guide information storage unit 232 may be implemented in the same storage medium as the area information storage unit 224, for example.

The guide control unit 236 controls provision of information to a user by the display unit 240. Specifically, the guide control unit 236 acquires guide information that is associated with the area information estimated by the estimation unit 228 from the guide information storage unit 232, and causes the display unit 240 to display the acquired guide information. Additionally, display is cited as an example of the interface used for providing information to a user, but provision of information to a user may also be performed by audio.

The display unit 240 displays, under control of the guide control unit 236, guide information that is according to the current position. According to this configuration, a user is allowed to obtain an explanation on an exhibit, a product, or the like the user is viewing, for example.

(2-3. Operation of Wireless Terminal)

In the foregoing, a configuration of the wireless terminal 20 according to the embodiment of the present disclosure has been described. Next, an operation of the wireless terminal 20 according to the embodiment of the present disclosure will be briefly described with reference to FIG. 9.

Figure 9:
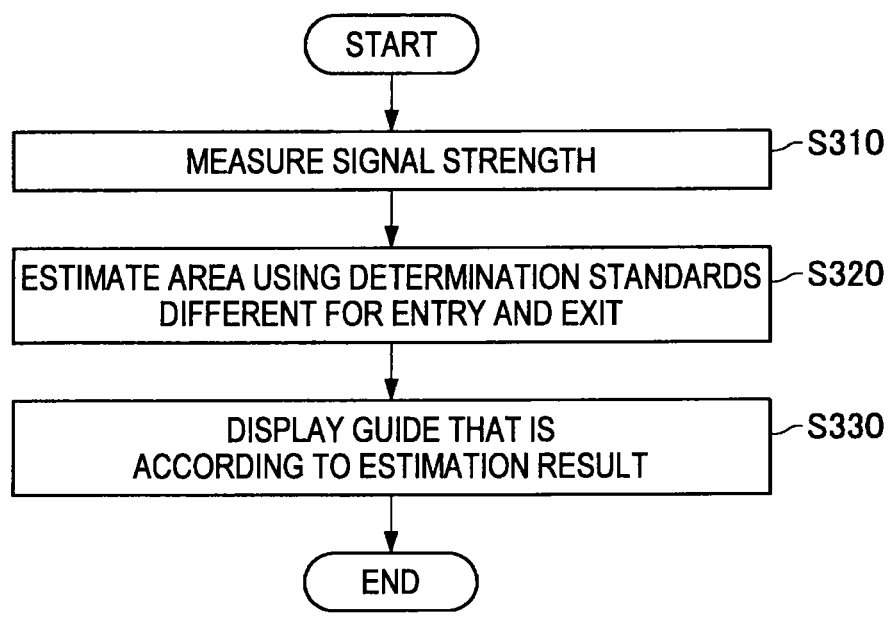
FIG. 9 is a flow chart showing an operation of a wireless terminal according to an embodiment of the present disclosure.

FIG. 9 is a flow chart showing an operation of the wireless terminal 20 according to the embodiment of the present disclosure. As shown in FIG. 9, first, the measurement unit 220 of the wireless terminal 20 performs signal strength measurement for wireless signal(s) transmitted from the surrounding base station(s) 30 (S310).

Then, the estimation unit 228 estimates the area the wireless terminal 20 is currently at based on the measurement information acquired by the measurement unit 220 and the information stored in the area information storage unit 224 (S320). As described above, the estimation unit 228 according to the embodiment of the present disclosure performs here, using different threshold values, determination of the degree of similarity for the registered measurement information that is associated with the area information which is the latest estimation result and the determination of the degree of similarity for another piece of registered measurement information.

Then, the guide control unit 236 acquires guide information that is associated with the area information estimated by the estimation unit 228 from the guide information storage unit 232, and causes the display unit 240 to display the acquired guide information (S330).

<3. Modified Example>

An example has been described above in which the wireless terminal 20 has an area estimation function, but the area estimation function may be implemented in a position estimation apparatus 40 as according to a position estimation system 2 of a modified example described below with reference to FIG. 10.

Figure 10:
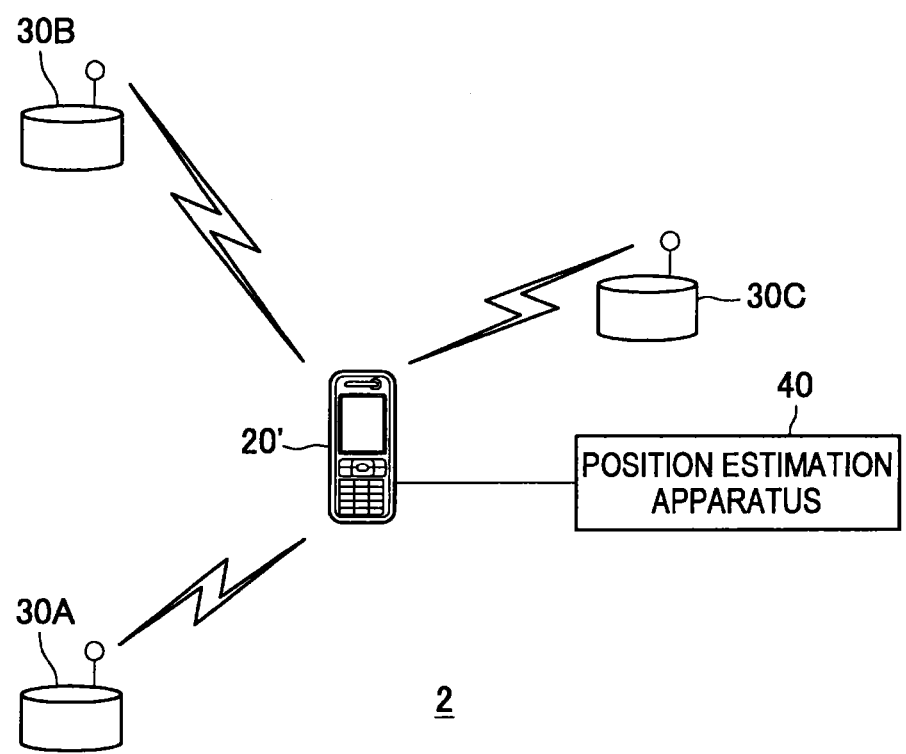
FIG. 10 is an explanatory diagram showing a configuration of a position estimation system according to a modified example.

FIG. 10 is an explanatory diagram showing a configuration of the position estimation system 2 according to the modified example. As shown in FIG. 10, the position estimation system 2 according to the modified example includes a wireless terminal 20', base stations 30A to 30C, and a position estimation apparatus 40. The position estimation apparatus 40 has functions of a communication unit for communicating with the wireless terminal 20, and of the area information storage unit 224 and the estimation unit 228, which have been described with reference to FIG. 3.

In such a position estimation system 2, the wireless terminal 20' performs signal strength measurement for a wireless signal, and the position estimation apparatus 40 receives from the wireless terminal 20' the measurement information obtained by the signal strength measurement by the wireless terminal 20'. Next, the position estimation apparatus 40 estimates the area information of the wireless terminal 20' using the function of the estimation unit 228 described above, and transmits the estimation result to the wireless terminal 20'. Then, the wireless terminal 20' displays guide information that is according to the area information received from the position estimation apparatus 40.

Additionally, the position estimation apparatus 40 may further include the functions of the guide information storage unit 232 and the guide control unit 236. In this case, guide information that is according to the estimation result regarding the area information is transmitted to the wireless terminal 20'. Then, the wireless terminal 20' displays the guide information received from the position estimation apparatus 40.

<4. Conclusion>

As has been described above, the estimation unit 228 according to the embodiment of the present disclosure performs, using different threshold values, determination of the degree of similarity for the registered measurement information that is associated with the area information which is the latest estimation result and the determination of the degree of similarity for another piece of registered measurement information. That is, the estimation unit 228 uses different standards for an entry determination threshold value (a first threshold value) used for determining that the wireless terminal 20 has entered a certain area and an exit determination threshold value (a second threshold value) used for determining that the wireless terminal 20 has exited the area.

To describe in greater detail, the estimation unit 228 uses a higher value (standard) for the entry determination threshold value than for the exit determination threshold value. According to this configuration, the estimation unit 228 can obtain a stable estimation result near the boundary of areas. The embodiment of the present disclosure as described is especially effective in a use case where a user walks throughout a certain area, such as a museum or a commercial facility.

It should be understood by those skilled in the art that various modifications, combinations, sub-combinations and alterations may occur depending on design requirements and other factors insofar as they are within the scope of the appended claims or the equivalents thereof.

For example, the steps of the processing of the wireless terminal 20 according to the present specification do not necessarily have to be processed chronologically according to the order described as the flow chart. For example, the steps of the processing of the wireless terminal 20 can also be processed in an order different from that described as the flow chart or may be processed in parallel.

Furthermore, a computer program for causing hardware, such as the CPU 201, the ROM 202, or the RAM 203, embedded in the wireless terminal 20 to realize an equivalent function as each element of the wireless terminal 20 described above can also be created. Furthermore, a storage medium storing the computer program is also provided.

The present disclosure contains subject matter related to that disclosed in Japanese Priority Patent Application JP 2011-006751 filed in the Japan Patent Office on Jan. 17, 2011, the entire content of which is hereby incorporated by reference.

What is claimed is:

1. A position estimation apparatus comprising:
   a storage unit in which at least one piece of section information indicating a section in a structure and at least one piece of registered measurement information are stored in association with each other; and
   an estimation unit for determining, among the at least one piece of registered measurement information, registered measurement information whose degree of similarity to measurement information acquired by wireless measurement for a wireless signal transmitted from a base station exceeds a threshold value, and estimating section information that is associated with the registered measurement information as an acquisition position of the measurement information,
   wherein the estimation unit performs, using different threshold values, determination of the degree of similarity for registered measurement information that is associated with latest section information which is a latest estimation result and determination of the degree of similarity for another piece of registered measurement information.

2. The position estimation apparatus according to claim 1, wherein the estimation unit
   uses a first threshold value when performing determination of the degree of similarity for the other piece of registered measurement information, which is not associated with the latest section information, and
   uses a second threshold value which is lower than the first threshold value when performing determination for the degree of similarity for the registered measurement information that is associated with latest section information.

3. The position estimation apparatus according to claim 2, further comprising:
   a wireless communication unit for receiving a wireless signal that is transmitted from the base station; and
   a measurement unit for performing signal strength measurement for the wireless signal received by the wireless communication unit.

4. The position estimation apparatus according to claim 2, further comprising:
   a communication unit for receiving the measurement information from a wireless terminal which performs signal strength measurement for a wireless signal that is transmitted from the base station, and transmits the section information estimated by the estimation unit to the wireless terminal.

5. A position estimation method comprising:
estimating, by determining, among at least one piece of registered measurement information stored in association with at least one piece of section information indicating a section in a structure, registered measurement information whose degree of similarity to measurement information acquired by wireless measurement for a wireless signal transmitted from a base station exceeds a threshold value, section information that is associated with the registered measurement information as an acquisition position of the measurement information, wherein, in the step of estimating, determination of the degree of similarity for registered measurement information that is associated with latest section information which is a latest estimation result and determination of the degree of similarity for another piece of registered measurement information are performed using different threshold values.

6. A non-transitory computer-readable storage medium storing computer-readable instructions thereon, which, when executed by a computer, cause the computer to function as a position estimation apparatus including:

a storage unit in which at least one piece of section information indicating a section in a structure and at least one piece of registered measurement information are stored in association with each other; and an estimation unit for determining, among the at least one piece of registered measurement information, registered measurement information whose degree of similarity to measurement information acquired by wireless measurement for a wireless signal transmitted from a base station exceeds a threshold value, and estimating section information that is associated with the registered measurement information as an acquisition position of the measurement information, wherein the estimation unit performs, using different threshold values, determination of the degree of similarity for registered measurement information that is associated with latest section information which is a latest estimation result and determination of the degree of similarity for another piece of registered measurement information.

7. A position estimation system comprising:
a wireless terminal including
  a wireless communication unit for receiving a wireless signal that is transmitted from a base station, and
  a measurement unit for performing signal strength measurement for the wireless signal received by the wireless communication unit; and
a position estimation apparatus including
  a storage unit in which at least one piece of section information indicating a section in a structure and at least one piece of registered measurement information are stored in association with each other, and
  an estimation unit for determining, among the at least one piece of registered measurement information, registered measurement information whose degree of similarity to measurement information that is based on the signal strength measurement by the wireless terminal exceeds a threshold value, and estimating section information that is associated with the registered measurement information to be an acquisition position of the measurement information,
wherein the estimation unit performs, using different threshold values, determination of the degree of similarity for registered measurement information that is associated with latest section information which is a latest estimation result and determination of the degree of similarity for another piece of registered measurement information.

* * * * *